(12) United States Patent
Fujisaki et al.

(10) Patent No.: US 11,372,260 B2
(45) Date of Patent: Jun. 28, 2022

(54) CAMERA DEVICE HAVING HAND-SHAKE CORRECTION FUNCTION

(71) Applicant: AAC Optics Solutions Pte. Ltd., Singapore (SG)

(72) Inventors: Yoshifumi Fujisaki, Osaka (JP); Shikama Kazuo, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 232 days.

(21) Appl. No.: 16/719,974

(22) Filed: Dec. 18, 2019

(65) Prior Publication Data
US 2020/0301160 A1   Sep. 24, 2020

(30) Foreign Application Priority Data

Mar. 19, 2019   (JP) .............................. JP2019-051719

(51) Int. Cl.
*G02B 27/64* (2006.01)
*G02B 26/08* (2006.01)
*G03B 5/00* (2021.01)
*G02B 7/18* (2021.01)

(52) U.S. Cl.
CPC ......... *G02B 27/646* (2013.01); *G02B 7/1805* (2013.01); *G02B 26/0816* (2013.01); *G03B 5/00* (2013.01); *G03B 2205/0023* (2013.01); *G03B 2205/0069* (2013.01)

(58) Field of Classification Search
CPC .. G02B 27/64; G02B 27/646; G02B 26/0816; G02B 26/101; G02B 13/0065; G02B 13/007; G02B 7/02; G02B 7/023; G02B 7/04; G02B 7/08; G02B 7/09; G02B 7/10; G02B 7/18; G02B 7/1805; G02B 7/182; G03B 5/00; G03B 5/02; G03B 5/04; G03B 5/06; G03B 5/08; G03B 5/32; G03B 5/34; G03B 5/36; G03B 2205/0023; G03B 2205/0069; G03B 2205/0061; G03B 2205/00; G03B 2205/0007; G03B 2205/0015; G03B 2205/003; G03B 2205/0046; G03B 2205/0053; G03B 30/00; H04N 5/2253; H04N 5/2254; H04N 5/23287; H04N 5/2328; H04N 5/23264
USPC .......................... 359/555, 556, 557, 813, 814
See application file for complete search history.

(56) References Cited

U.S. PATENT DOCUMENTS

2008/0129831 A1 *  6/2008  Cho ....................... G03B 17/17
                                                               348/208.16
2018/0367714 A1 * 12/2018  Im ........................... G02B 7/102

* cited by examiner

*Primary Examiner* — Marin Pichler
(74) *Attorney, Agent, or Firm* — W&G Law Group

(57) ABSTRACT

The present disclosure provides an anti-shake mechanism of a curved camera device. The camera device is an optical system including a reflecting member having a reflecting surface that bends an optical axis and is configured to perform a hand-shake correction by rotating the reflecting member. The reflecting member is disposed between a camera lens group and a camera element in such a manner that the reflecting member rotates about rotation axes, one of the rotation axes being perpendicular to a plane defined by an optical axis of the camera lens group and an optical axis reflected by the reflecting member, and the other one of the rotation axes being parallel with the reflected optical axis or parallel with the optical axis of the camera lens group.

8 Claims, 7 Drawing Sheets

CAMERA DEVICE HAVING HAND-SHAKE CORRECTION FUNCTION

TECHNICAL FIELD

The present disclosure relates to a camera device having a hand-shake correction function.

BACKGROUND

With the rapid development of photographic technology, lens driving devices have been widely used in numerous camera devices. Applications of the lens driving devices to various portable electronic devices, such as mobile phones, tablets, etc., are particularly acceptable to consumers.

A drive mechanism applicable for a lens driving device of a general portable electronic device is generally formed by a coil and a permanent magnet. The coil is fixed to an outer circumference of a camera lens frame. When a current is applied to the coil, by an action of an electromagnetic force, the coil causes the camera lens frame to move along a direction of an optical axis of a lens, thereby achieving focusing. In addition, when a user holds the electronic apparatus with hands to take an image, shake of the lens driving device caused by hand-shake can be corrected by driving in a direction perpendicular to the optical axis. However, for example, for a zoom optical system, which has a relatively long total optical length, of a small optical device provided on a portable electronic device, it is difficult for it to be directly provided on the portable electronic device, and it is necessary to use a structure such as a curvature.

For such an optical system using a curved structure, a camera lens, which is disposed before and after a prism or a mirror for bending a light, is used for the shake correction, whereas in the portable electronic devices which are developed towards miniaturization, due to the use of these shake correction structures of the camera lens disposed before and after, a total length of the curved optical system may become longer, or it may become a structure in which a part of a shape protrudes.

Therefore, it is necessary to provide a new lens driving device that can solve the above problems.

DESCRIPTION OF EMBODIMENTS

Figure 1:
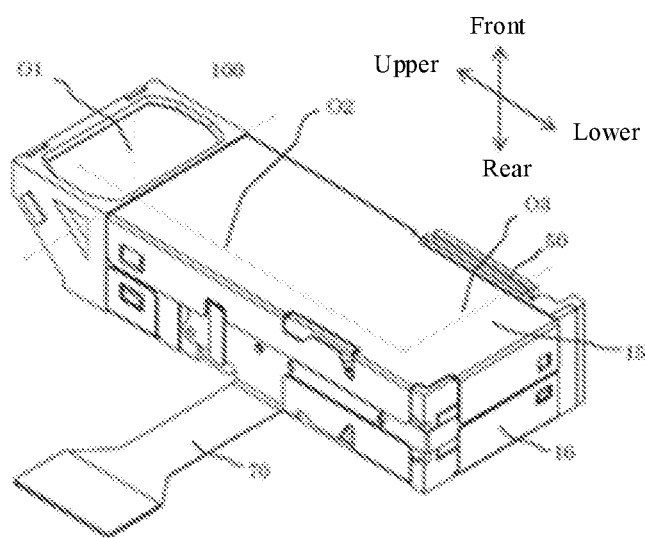
FIG. 1 is a perspective view of a curved camera device according to a first embodiment of the present disclosure.
Figure 2:
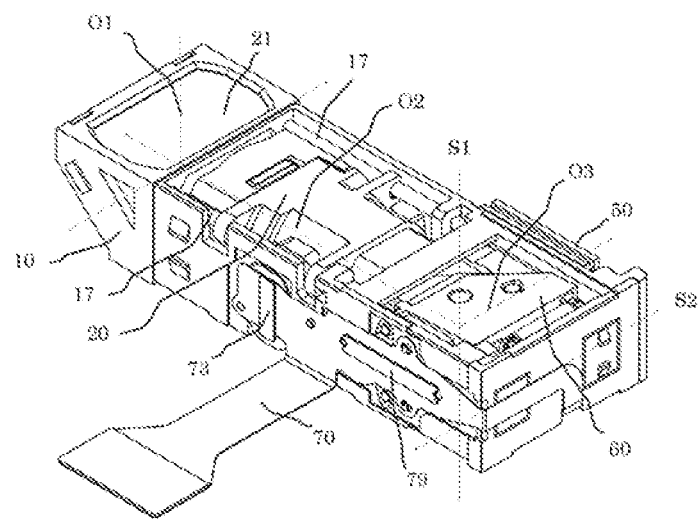
FIG. 2 is a perspective view of a curved camera device according to a first embodiment of the present disclosure, with a front side cover plate and a rear side cover plate removed.

Hereinafter, the present disclosure will be further illustrated with reference to the accompanying drawings and the embodiments.

FIGS. 1 to 4 are views showing a curved camera device 100 of the present disclosure.

FIGS. 1 to 8 show a camera device and constituent elements thereof according to a first embodiment of the present disclosure.

A camera optical system of the curved camera device 100 is a curved optical system, which includes, from an object side, a first prism 21, a camera lens group 31, a second prism 41 and a camera element 51, and reflects a light beam by the first prism and the second prism.

The light beam, which is incident on an incident surface 21-*a* of the first prism 21 along a first optical axis O1 from an object to be captured, is reflected by a reflecting surface 21-*b* of the first prism 21 towards a direction along a second optical axis O2 (from left towards right) and emitted from an emission surface 21-*c*. Then, the light beam passes through the camera lens group 31 located on the second optical axis O2, passes through an incident surface 41-*a* to enter the second prism 41, and is then reflected by a reflecting surface 41-*b* of the second prism 41 towards a direction along a third optical axis O3 (a direction from rear towards front) and emitted from an emission surface 41-*c*, so as to be imaged on an imaging surface of the image sensor 51.

Figure 8:
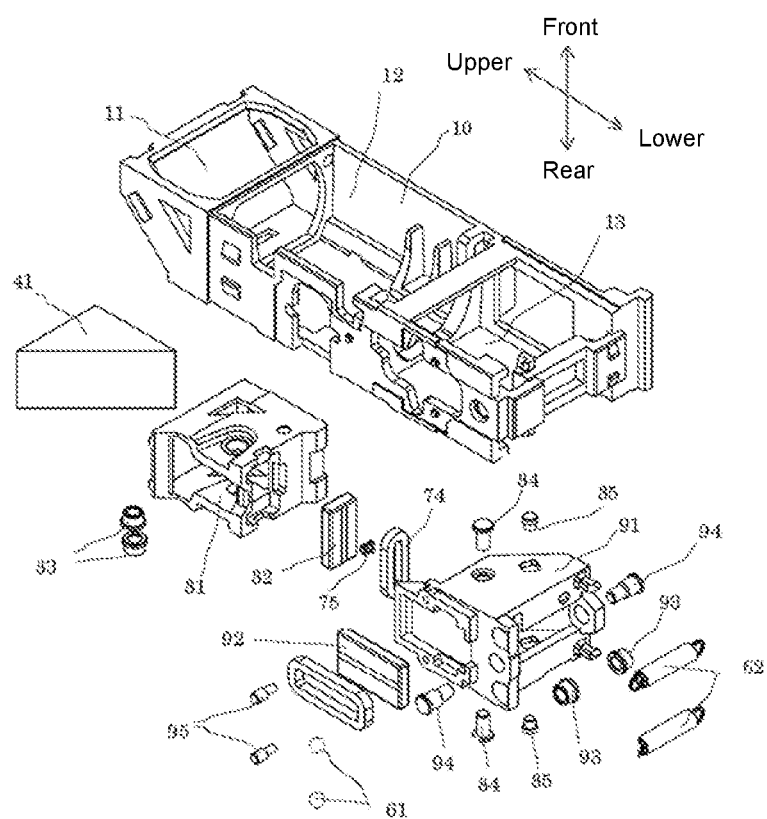
FIG. 8 is an exploded view of an anti-shake unit of a curved camera device according to a first embodiment of the present disclosure.

The curved camera device 100 includes a housing 10 as a base member. As shown in FIG. 8, the housing 10 includes a box-shaped upper opening portion 11 that is open upwardly, a box-shaped front side opening portion 12 that is open and a rear side opening portion 13 that are open in a front-rear direction. The first prism 21 is held in the box-shaped upper opening portion 11. At the front side opening portion 12, a lens frame 31 holding the camera lens group is supported by two shafts 17, and it is held in such a manner that it can move forward and backward along the second optical axis O2. At the rear side opening portion 13, an anti-shake unit 60 holding the second prism 41 is rotatably shaft-supported by a shaft supporting member that is substantially parallel with the third optical axis O3. A camera element unit 50 is fixed in a direction perpendicular to the third optical axis O3 of the light beam that is emitted from the second prism 41.

Figure 3:
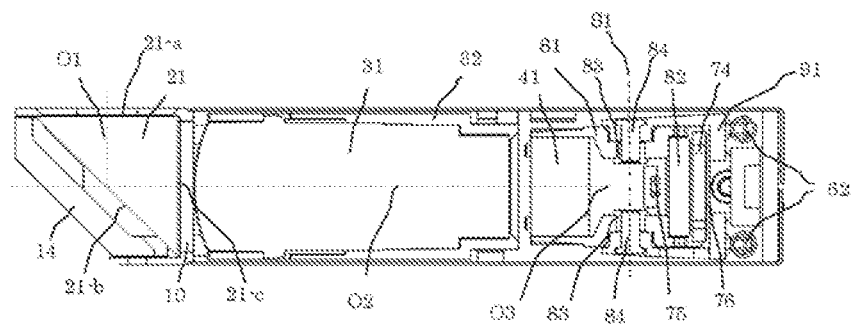
FIG. 3 is a cross-sectional view of a curved camera device according to a first embodiment of the present disclosure taken along a plane passing through a rotation axis AS1 and parallel with a second optical axis.
Figure 4:
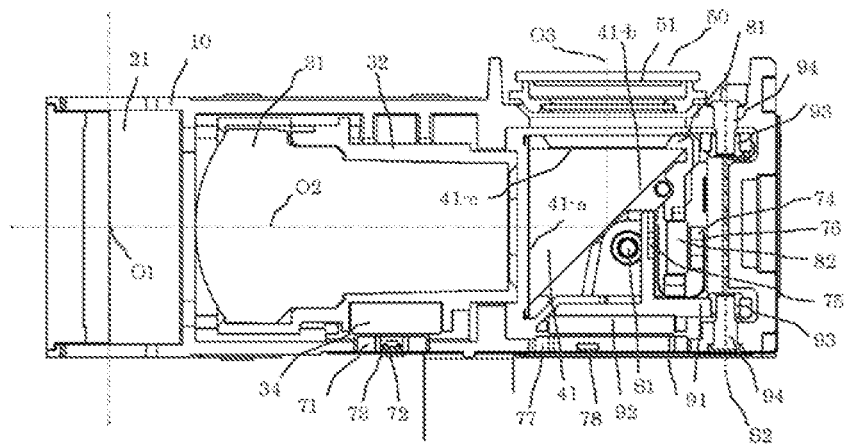
FIG. 4 is a cross-sectional view of a curved camera device according to a first embodiment of the present disclosure taken along a plane passing through a rotation axis BS2 and parallel with a third optical axis.
Figure 5:
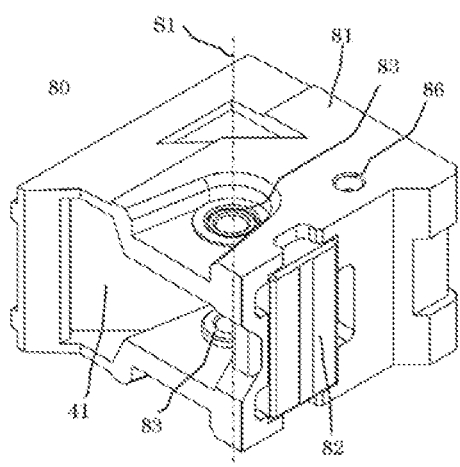
FIG. 5 is a perspective view of a first bracket of a curved camera device according to a first embodiment of the present disclosure.
Figure 6:
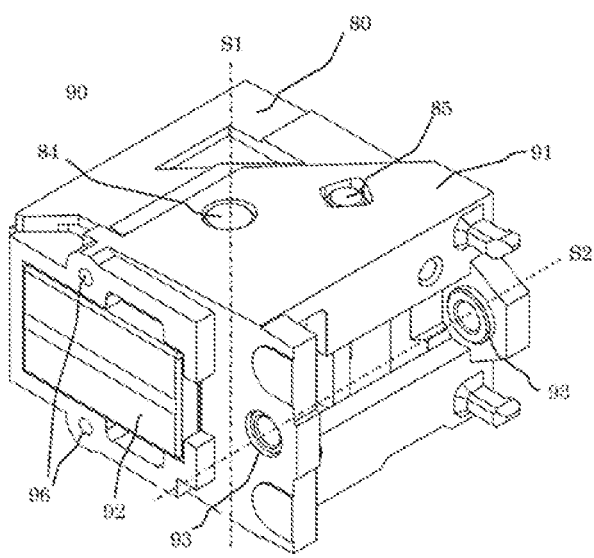
FIG. 6 is a perspective view of a second bracket of a curved camera device according to a first embodiment of the present disclosure.
Figure 7:
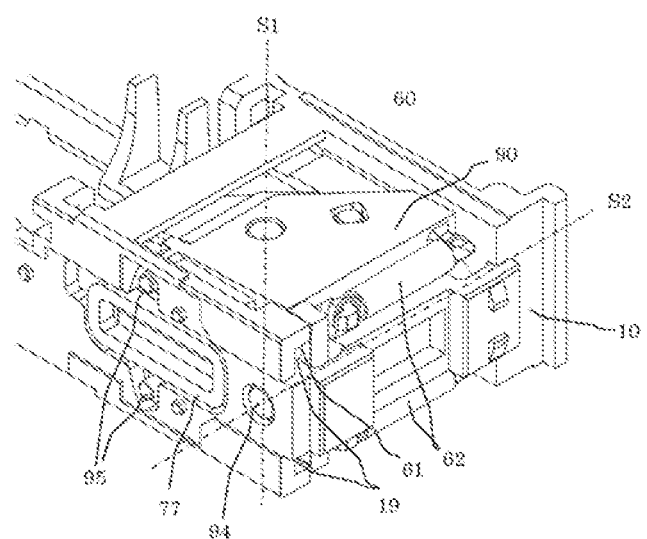
FIG. 7 is a perspective view of an anti-shake unit of a curved camera device according to a first embodiment of the present disclosure.

The upper opening portion 11, the front side opening portion 12, and the rear side opening portion 13 of the housing 10 are covered by a first prism cover plate 14, a front side cover plate 15 and a rear side cover plate 16, respectively (FIGS. 1 and 3).

A camera lens frame 32 that holds the camera lens group 31 is supported, in the box-shaped front side opening portion 12, by two shafts 17 so as to be linearly movable along the second optical axis O2. The camera lens frame 32 moves forward and backward along the second optical axis O2 by a driving force of an electromagnetic actuator (a voice coil motor) composed of a focusing permanent magnet 34 and a flexible substrate 70, so as to perform a focusing action. The flexible substrate 70 is provided with a focusing coil 71 and a focusing Hall sensor 72 that are fixed to a hole portion 18 of the housing 10 facing the focusing permanent magnet 34.

The focusing yoke 73 is provided on a surface side of the focusing coil 71 that is not facing the focusing permanent magnet 34, and it is fixed to the housing 10 in the same manner as the focusing coil 71.

The focusing yoke 73 has a function of causing the focusing permanent magnet 34 to return to a magnetic spring at a given position when the camera lens group 31 moves due to a change in a focus position, and also has a function of applying a force in one direction with respect to radial sway between the camera lens group 31 and the shaft 17 supporting the camera lens frame 32, and a function of causing leakage magnetic flux of the focusing coil 71 to converge so as to increase an electromagnetic efficiency of the focusing permanent magnet 34 and the focusing coil 71.

By providing the focusing Hall sensor 72, a position of the focusing permanent magnet 34 can be detected, thereby achieving an adjustment of the focus position with a higher precision and an accurate control in the case where an adjustment speed of the focus is relatively important.

The focusing coil 71 may be a coil winding that is mounted and fixed to the housing 10, or a conductive pattern formed directly on the flexible substrate 70.

The curved camera device 100 includes an anti-shake (image shake correction) unit 60, and the anti-shake (image shake correction) unit 60 mitigates the image shake on an image plane caused by a vibration such as hand-shake. The anti-shake unit 60 is configured in such a manner that it enables the second prism 41 to rotate with a rotation axis AS1 perpendicular to a plane including the second optical axis O2 and the third optical axis O3 and a rotation axis BS2 parallel with the third optical axis O3 as rotation axes.

The second prism 41 is fixed to a first bracket 81 by bonding or the like. In addition, a permanent magnet A82 constituting a voice coil motor is further fixed to the first bracket. A bushing 83 made of metal is press-fitted into a hole portion of the rotation axis AS1 axis that is shaft-supported at a second bracket 91. This block is referred to as a first bracket block 80.

The first bracket block 80 is shaft-supported by inserting a shaft 84 into the rotation axis AS1 axis of the second bracket 91. The shaft 84 is fixed to a hole portion of the second bracket and is dimensioned to be able to smoothly rotate with respect to the bushing 83. In addition, by inserting a pin 85 into a hole portion A86 of the first bracket in this state, a movable range of the first bracket block 80 with respect to the second bracket 91 in a rotation direction is restricted.

The rotation axis BS2 in this case is preferably as close as possible to the reflecting surface 41-*b* of the second prism.

The second bracket 91 is further provided with an anti-shake flexible substrate 70. The anti-shake flexible substrate 70 is provided with an anti-shake coil A74 and an anti-shake Hall sensor A75 for position detection, and constitutes a voice coil motor together with the permanent magnet A82 of the first bracket block 80 by fixing the anti-shake coil A74 and the anti-shake Hall sensor A75 at a position shown in the drawing. Further, an anti-shake yoke A76 made of a magnetic metal is adhered to a back surface of the anti-shake coil A74 of the flexible substrate 70, and functions as a magnetic spring that is held at a given position (a center of the movement range in the embodiment) by magnetism with the permanent magnet A82 of the first bracket block 80.

A permanent magnet B92 constituting a voice coil motor is also fixed to the second bracket 91, and a bushing 93 made of metal is press-fitted into a hole portion of the rotation axis BS2 axis that is shaft-supported at the housing 10. This block is referred to as a second bracket block 90.

The second bracket block 90 is inserted from the rear side opening portion 13 of the housing 10 and is shaft-supported by inserting the shaft 94 into the rotation axis B2 axis. The shaft 94 is fixed to a hole portion of the housing and is dimensioned to be able to smoothly rotate with respect to the bushing 93. Further, by inserting a pin 95 into a hole portion B96 of the second bracket 91 in this state, a movable range of the second bracket block 90 with respect to the housing 10 in a rotation direction is restricted.

The housing 10 is further provided with a flexible substrate 70. The flexible substrate 70 is provided with an anti-shake coil B77 and an anti-shake Hall sensor B78 for position detection, and constitutes a voice coil motor together with the permanent magnet B92 of the second bracket block 90 by fixing the anti-shake coil B77 and the anti-shake Hall sensor 78B at a position shown in the drawing. Further, a yoke, i.e., a yoke B79, which is made of a magnetic metal and mutually attracted with the permanent magnet B92 of the electromagnetic actuator, is adhered on a back surface of the anti-shake coil B77 of the flexible substrate 70. The anti-shake yoke B79 functions as a magnetic spring that is held at a given position (a center of the movement range in the embodiment) by magnetism with the permanent magnet B92 of the second bracket block 90.

The housing 10 includes a groove portion 19 capable of holding a ball 61, for use in sliding of the second bracket block 90. In addition, a sliding surface is also formed in opposite portions of the second bracket 91, and similar to the sliding surface of the housing, surface precision is set so that the rotation can be smooth. The housing 10 and the second bracket block 90 are supplied with a force by a tension spring 62 in such a direction that they are caused to abut against the ball 61, and a position in the direction parallel with the rotation axis can be determined according to a height of the ball. Further, an object is to eliminate the sway caused by manufacturing errors of various members.

Further, a force applying direction of the spring 62 is consistent with an attraction direction between the permanent magnet B92 and the anti-shake yoke B79 that are constituting the magnetic spring that holds the second bracket block 90, thereby achieving a more stable magnetic spring effect.

In the case where the second prism 41 has a sway component in a direction parallel with the second optical axis O2 or the third optical axis O3, the third optical axis O3 might move in parallel to generate an image shake that is beyond the hand-shake correction control or generate a focus shift caused by a change in a length of an optical path. Therefore, in the present embodiment, it is necessary to eliminate the sway component of the second bracket block 90 in the direction parallel with the rotation axis.

In the present disclosure, by applying a spring force to the second bracket in the direction parallel with the rotation axis and using the balls in a sliding portion, the sway can be reliably eliminated with a low load.

Figure 9:
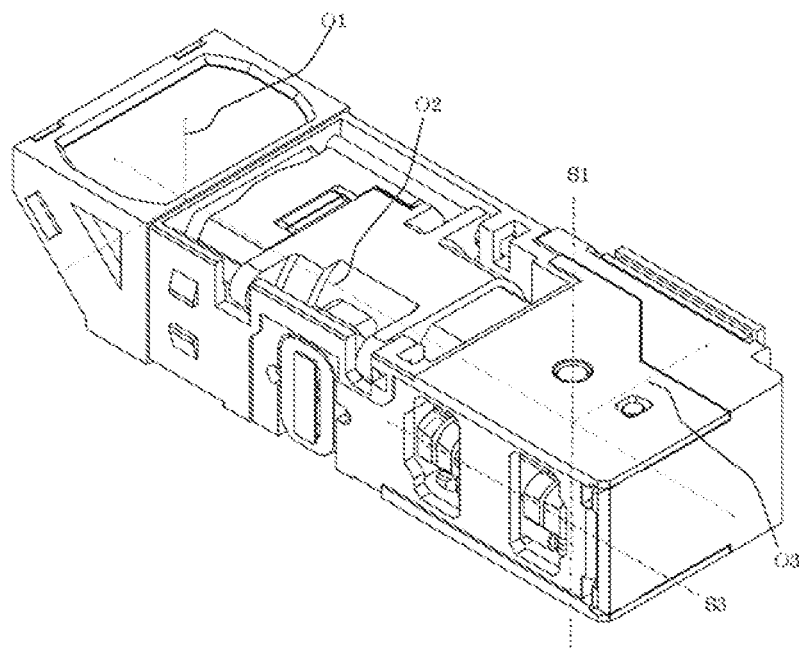
FIG. 9 is a perspective view of a curved camera device according to a second embodiment of the present disclosure.
Figure 10:
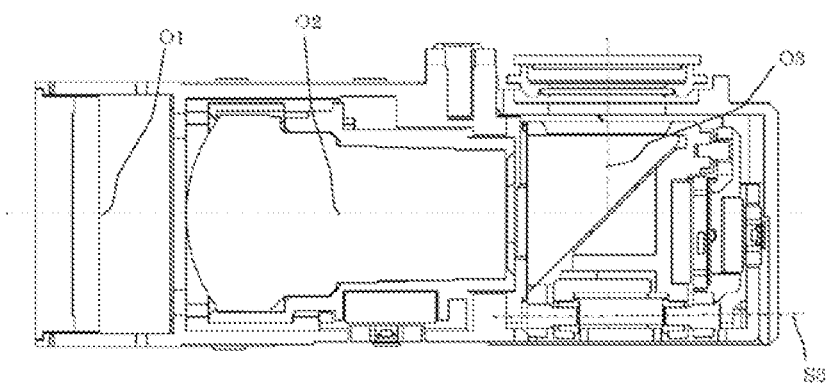
FIG. 10 is a cross-sectional view of a curved camera device according to a second embodiment of the present disclosure taken along a plane passing through a rotation axis CS3 and parallel with a third optical axis.
Figure 11:
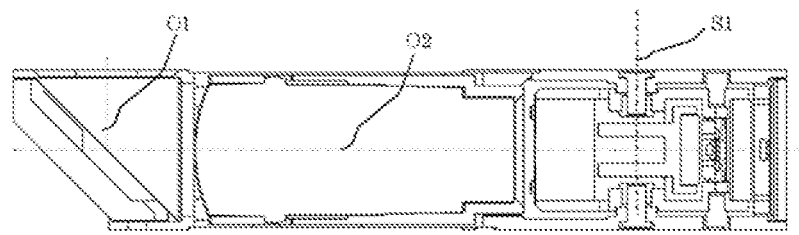
FIG. 11 is a cross-sectional view of a curved camera device according to a second embodiment of the present disclosure taken along a plane passing through a rotation axis AS1 and parallel with a second optical axis.

FIGS. 9 to 11 show a camera device and constituent elements thereof according to a second embodiment of the present disclosure.

A difference from the first embodiment lies in the direction of the rotation axis of the anti-shake unit.

In the first embodiment, it is the rotation axis AS1 perpendicular to the plane including the second optical axis O2 and the third optical axis O3 and the rotation axis BS2 substantially parallel with the third optical axis O3, while in the second embodiment, it is the rotation axis AS1 perpendicular to the plane including the second optical axis O2 and the third optical axis O3 and a rotation axis CS3 substantially parallel with the second optical axis O2.

The constituent elements are basically the same as those in the first embodiment, and in this case as well, the camera device will not become large-scale, such that a space-saving anti-shake mechanism can be achieved to solve the problem.

In the present embodiment, the second prism can be a mirror.

Figure 12:
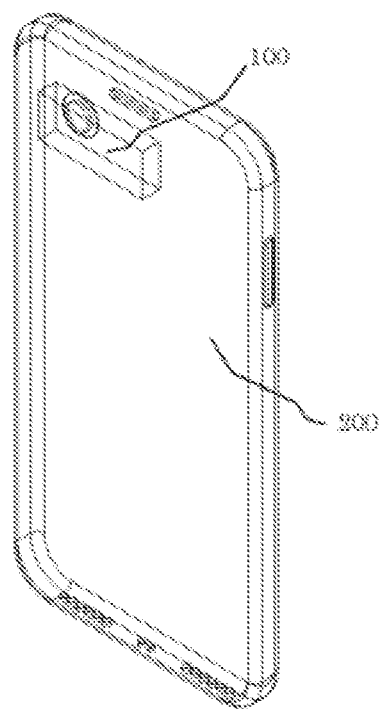
FIG. 12 shows a portable electronic device (a portable information terminal) including a curved camera device according to the present disclosure.

For example, the above curved camera device 100 can also be a camera device 100 for use in a portable information device 200 as shown in FIG. 12, such as a so-called smart phone, a so-called function phone or a tablet device.

What has been described above are only embodiments of the present disclosure, and the scope the present disclosure is not limited to the above embodiments. All equivalent modifications and variations made by those skilled in the art based on contents of the present disclosure are within the scope of the appended claims of the present disclosure.

SYMBOL DESCRIPTION

10 . . . housing
11 . . . upper opening portion
12 . . . front side opening portion
13 . . . rear side opening portion
14 . . . first prism cover plate
15 . . . front side cover plate
16 . . . rear side cover plate
17 . . . shaft
18 . . . hole portion
19 . . . groove portion
21 . . . first prism
21-a . . . incidence surface of first prism
21-b . . . reflecting surface of first prism
21-c . . . emission surface of first prism
31 . . . camera lens group
32 . . . camera lens frame
33 . . . recessed portion
34 . . . focusing permanent magnet
41 . . . second prism
41-a . . . incidence surface of second prism
41-b . . . reflecting surface of second prism
41-c . . . emission surface of second prism
50 . . . camera element unit
51 . . . camera element
60 . . . anti-shake unit
61 . . . ball
62 . . . spring
70 . . . flexible substrate
71 . . . focusing coil
72 . . . focusing Hall sensor
73 . . . focusing yoke
74 . . . anti-shake coil A
75 . . . anti-shake Hall Sensor A
76 . . . anti-shake yoke A
77 . . . anti-shake coil B
78 . . . anti-shake Hall sensor B
79 . . . anti-shake yoke B
80 . . . first bracket block
81 . . . first bracket
82 . . . permanent magnet A
83 . . . bushing
84 . . . shaft
85 . . . pin
86 . . . hole portion A
90 . . . second bracket block
91 . . . second bracket
92 . . . permanent magnet B
93 . . . bushing
94 . . . shaft
95 . . . pin
96 . . . hole portion B
100 . . . curved camera device
200 . . . portable information device
O1 . . . first optical axis
O2 . . . second optical axis
O3 . . . third optical axis
S1 . . . rotation axis A
S2 . . . rotation axis B
S3 . . . rotation axis C.

What is claimed is:

1. An anti-shake mechanism of a curved camera device, the camera device being an optical system comprising a first prism having a reflecting surface and a first optical axis, a camera lens group having a second optical axis, a second prism having a reflecting surface and a third optical axis, and a camera element successively,
wherein, the second prism is spaced from the camera element along the third optical axis;
the second optical axis is reflected by the reflecting surface of the first prism, the third optical axis is reflected by the reflecting surface of the second prism;
the first optical axis, the second optical axis and the third optical axis are perpendicular to each other;
the second prism is disposed between the camera lens group and the camera element in such a manner that the second prism rotates about rotation axes to perform a hand-shake correction, one of the rotation axes being perpendicular to a plane defined by the second optical axis of the camera lens group and the third optical axis of the second prism, and the other one of the rotation axes being parallel with the third optical axis of the second prism or parallel with the second optical axis of the camera lens group.

2. The anti-shake mechanism of the curved camera device as described in claim 1, wherein,
the second prism is held at a first holding frame and held at a second holding frame rotatable about one of the rotation axes, the second holding frame is held at a base member in such a manner that the second holding frame is rotatable about an axis that is in a direction perpendicular to one of the rotation axes, an electromagnetic actuator that rotates the first holding frame is provided between the first holding frame and the second holding frame, and an electromagnetic actuator that rotates the second holding frame is provided between the second holding frame and the base member.

3. The anti-shake mechanism of the curved camera device as described in claim 2, wherein, the first holding frame or the second holding frame, which causes the rotating member to rotate about the rotation axis parallel with the third optical axis or parallel with the second optical axis of the camera lens group, comprises a force-applying unit for eliminating axial sway.

4. The anti-shake mechanism of the curved camera device as described in claim 1, wherein a ball is used on a sliding surface to reduce friction.

5. The anti-shake mechanism of the curved camera device as described in claim 1, wherein,
the electromagnetic actuator is a voice coil motor.

6. The anti-shake mechanism of the curved camera device as described in claim 5, wherein,
a force-applying direction is the same as a direction in which a permanent magnet and a yoke of the electromagnetic actuator attract each other.

7. A camera, comprising an anti-shake mechanism of a curved camera device as described in claim 1.

8. A portable electronic device, comprising a camera as described in claim 7.

* * * * *